Patented Sept. 17, 1935

2,014,623

UNITED STATES PATENT OFFICE 2,014,623

CHOCOLATE SIRUP

David E. Linn, La Grange, Ill., assignor to International Patents Development Company, Wilmington, Del., a corporation of Delaware No Drawing. Application August 6, 1934,
Serial No. 738,592

22 Claims. (Cl. 99—11)

This invention relates to the stabilizing of chocolate sirups, such as are used at soda fountains and elsewhere, to prevent the stratification of the sirup, that is the separation of the suspended ingredients according to their specific gravities, which ordinarily takes place after the sirup has stood for a while. The invention also relates to stabilizing compounds whether used for chocolate sirups or otherwise.

One of the objects of the invention is to provide a method of compounding chocolate sirups so as to bring about effective stabilization; that is so as to check the tendency, in particular, of the chocolate fibres to subside, and the fats of the chocolate to rise in the sugar solution.

Another object of the invention is to provide a new stabilizing compound for use in stabilizing chocolate sirups, according to the method to be hereinafter described, and also for stabilizing other chocolate suspensions such as milk and chocolate beverages. The compound herein described and claimed was originaly disclosed in, and subsequently divided out of, a copending application of the present applicant, Serial No. 653,168 filed January 20, 1933, for Milk and chocolate suspensions. (Patented as No. 1,989,758, Feb. 5, 1935.)

Chocolate sirups consist usually of water, sugar and chocolate, and contain, also, ordinarily but not necessarily, certain condiments and flavoring extracts such as salt and vanilla. These sirups are usually quite viscous due to their large sugar content. Despite their viscosity, however, if ordinary chocolate fountain sirups are allowed to stand without occasional stirring the chocolate fibres will, to a considerable extent at least, sink to the bottom of the vessel, and the fats rise to the top.

According to the present invention, the stability and relative permanence of the suspension is brought about by incorporating the chocolate and the sugar in a protective colloidal suspension consisting of water and swelled starch and containing also, preferably, a small amount of agar-agar or equivalent water dispersible animal or vegetable gum. It is possible to use starch alone, in this connection, but in that case considerably larger quantities must be used, much larger, that is, than the aggregate quantities of starch and agar-agar prescribed for the preferred procedure; and this is undesirable because of the possibility that the sirup will taste of the starch. Moreover, even with the use of larger quantities of starch, the stabilizing effect will not be as great as that obtainable if a very small amount of agar-agar is mixed with the starch. The swelled starch appears to act as a protective colloid preventing the separation of the chocolate fibres and fats. The agar-agar seems to act as a protective colloid preventing the starch particles from coalescing and being precipitated from the suspension. The agar-agar, however, does not seem to act effectively as a protective colloid in respect particularly to the fats in the chocolate, and hence it is not desirable to use agar-agar alone. These phenomena are probably electrical in character. Apparently the protective colloids carry charges of the same sign as the particles to be kept in suspension, and, by intervention between such particles prevent the same from coalescing and, because of the increased difference of gravity, falling or rising in the liquid medium in which they are suspended.

Whether this theory is correct or not, the facts as to the stabilizing effect of starch and agar-agar in suspension have been demonstrated by repeated experiments.

The starch (with its agar-agar content) is first cooked, but preferably, at relatively low temperatures so as to avoid giving the sirup any cooked starch flavor. If the starch contains even a small amount of agar-agar, it is unnecessary to cook at high temperatures in order to obtain a protective colloidal suspension adequate for stabilizing the sirup.

The chocolate is then introduced into the starch paste, and its fibres and starch particles swelled under action of heat and in the presence of water. It is feasible, but less desirable to mix together the starch, water and chocolate and cook them by one operation.

Finally the sugar is added and dissolved with continued heating and agitation.

The reason for adding the sugar last is to obviate the effect of the osmotic pressure of the sugar solution on the colloidal particles in suspension, particularly the effect of osmotic pressure on the starch particles. If the starch were added to a water solution of sugar, and the mixture cooked, the osmotic pressure of the solution would prevent the proper swelling of the starch.

It is possible, however, to introduce the chocolate into the mixture after the sugar has been added and dissolved if the protective colloidal suspension provided by the swelled starch has been prepared before the sugar is added. However, it is preferable to introduce the chocolate before the sugar is added.

The word "chocolate" as used herein is intended to include cocoa as well as chocolate in the strict sense of the term. The term "sugar" is intended to include sucrose, dextrose or other suitable sugar, together with mixtures of such sugars. The invention contemplates the use of corn starch particularly, but it is possible to use other starches such as wheat starch, potato starch, tapioca starch, although corn starch is preferred. In place of agar-agar one may use any animal or vegetable gum that is dispersible in water, such as gelatin, gum arabic, gum tragacanth and pectins, such as Irish moss, citrus pectin and apple pectin. These substances are termed collectively "stabilizing gums". Experience shows, however, that agar-agar is to be preferred to any of the other gums mentioned above.

To give a typical example of a chocolate sirup made in accordance with this invention, it may consist of the following substances and proportions substantially as follows:

| | | |
|---|---|---|
| Cane sugar | pounds | 18.75 |
| Cerelose (high purity dextrose) | do | 37.5 |
| Cocoa | do | 12.5 |
| Water | do | 43.0 |
| Salt | ounces | 4 |
| Vanilla extract | pint | 1 |
| Stabilizing agent consisting of corn starch and 1.75% agar-agar by weight of the starch on dry substance basis (about 0.9% by weight of the furnished sirup) | pound | 1 |

The quantities of sugar and chocolate may vary very considerably in proportion to the amount of water. The stabilizing agent (starch and agar-agar) may vary from 0.7 to 1.2% by weight of the finished sirup including water. The amount of agar-agar in the stabilizing agent may vary from 1.0% to 10.0% by weight of the starch on dry substance basis.

The preferred method of compounding the sirup is as follows:

A smooth paste is made of the starch and agar-agar compound with a small amount of water. The rest of the water is then added and the temperature raised to a point below the boiling point, preferably to about 205° Fahrenheit. The heating is continued with constant agitation for about ten minutes. This treatment converts the starch into a thin paste and completely dissolves the agar-agar. Experience shows that the best results are obtained if the starch is powdered and the agar-agar ground finely enough so that it will pass through a screen having sixty or preferably eighty meshes to the linear inch. The ground agar-agar is mixed with the starch so as to be as evenly distributed therein as possible.

The chocolate is then added. Preferably a smooth chocolate paste is made by removing some of the starch paste from the batch. The chocolate paste is then mixed into the batch with continued heating and agitation.

The sugars are then added and dissolved with continued heating and agitation. If salt is used, it is added next, and thereafter the vanilla, the latter preferably after the batch has been cooled somewhat.

The above ingredients in the quantities indicated will make about 10½ gallons of finished sirup.

The preparing of the stabilizing agent and the compounding of the sirup may be performed as separate operations at different times and places. The stabilizing agent may be made and sold, in fact, as a separate article of commerce for use in manufacturing the fountain sirups, according to the process of this application, or for use in the manufacture of other chocolate suspensions, such, for example, as milk and chocolate beverages. If the compound is destined for the manufacture of a milk and chocolate beverage, it is possible, and will sometimes serve the convenience of the manufacturer of the beverage, to incorporate the sugar to be used in the beverage with the starch and agar-agar compound. If the compound is to be used for a chocolate sirup containing a large amount of sugar, the sugar should not be mixed with the stabilizing compound but added after the stabilizing compound has been pasted, for the reasons above set forth.

In chocolate milk beverages the amount of sugar is so small that the factor of osmotic pressure is negligible.

It is the intention to cover by patent all modifications of the above described method and products within the scope of the hereto appended claims.

I claim:

1. Method of making a stable chocolate sirup which comprises incorporating the ingredients of the sirup in a previously formed protective colloidal suspension containing swelled starch.

2. Method of making a stable chocolate sirup which comprises incorporating the ingredients of the sirup in a protective colloidal suspension containing swelled starch and a small quantity of a water dispersible gum.

3. Method of making a stable chocolate sirup which comprises incorporating the ingredients of the sirup in a protective colloidal suspension containing swelled starch and a small quantity of agar-agar.

4. Method of making a stable chocolate sirup which comprises incorporating the ingredients of the sirup in a protective colloidal suspension containing swelled starch and agar-agar in quantity from 1.0% to 10.0% by weight of the starch on dry substance basis.

5. Method of making a stable chocolate sirup which comprises incorporating the ingredients of the sirup in a protective colloidal suspension containing swelled starch and about 1.8% agar-agar by weight of the starch on dry substance basis.

6. Method of making a stable chocolate sirup which comprises incorporating the ingredients of the sirup in a protective colloidal suspension consisting of swelled starch and a water dispersible gum in quantity from 0.7% to 1.2% by weight of the finished sirup.

7. Method of making a stable chocolate sirup which comprises incorporating the ingredients of the sirup in a protective colloidal suspension consisting of swelled starch and agar-agar in which the proportion of agar-agar is from 1.0% to 10.0% by weight of the starch on dry substance basis.

8. Method of making a stable chocolate sirup which comprises incorporating the ingredients of the sirup in a previously formed protective colloidal suspension containing starch swelled by cooking at temperatures below the boiling point.

9. Method of making a stable chocolate sirup which comprises incorporating the ingredients of the sirup in a previously formed protective colloidal suspension containing starch swelled by cooking at a temperature of about 205° Fahrenheit.

10. Method of making a stable chocolate sirup which comprises heating starch in water to form a protective colloidal suspension and incorporating in such suspension, with continued heating, chocolate and sugar.

11. Method of making a stable chocolate sirup which comprises heating starch in water to form a protective colloidal suspension and incorporating in such suspension, with continued heating, first chocolate and thereafter sugar.

12. Method of making a stable chocolate sirup which comprises heating starch in water to form a protective colloidal suspension and incorporating chocolate and sugar in such suspension with continued heating at a temperature below the boiling point.

13. Method of making a stable chocolate sirup which comprises heating in water starch and a small quantity of a water dispersible gum to form a protective colloidal suspension and incorporating in such a suspension, by agitation with continued heating, chocolate and sugar.

14. Method of making a stable chocolate sirup which comprises heating in water starch and a small quantity of agar-agar to form a protective colloidal suspension and incorporating in such suspension, by agitation with continued heating, chocolate and sugar.

15. A stable chocolate sirup containing, as a protective colloid, swelled starch and a small quantity of a water dispersible gum.

16. A stable chocolate sirup containing, as a protective colloid, swelled starch and a small quantity of agar-agar.

17. A stable chocolate sirup containing as a protective colloid from 0.7% to 1.2% by weight of the finished sirup of swelled starch and agar-agar, in which the proportion of agar-agar to starch is from 1.0% to 10.0% by weight of the starch on dry substance basis.

18. A stabilizing agent for making chocolate suspensions consisting of powdered starch with which is intimately mixed, with relatively uniform distribution, a small quantity of finely ground stabilizing gum.

19. A stabilizing agent for making chocolate suspensions consisting of powdered starch with which is intimately mixed, with relatively uniform distribution, a small quantity of finely ground stabilizing gum in quantity from 1% to 10%, by weight of the starch on dry substance basis.

20. A stabilizing agent for making chocolate suspensions consisting of starch with which is intimately mixed, with substantially uniform distribution, a small quantity of agar-agar.

21. A stabilizing agent for making chocolate suspensions consisting of starch with which is intimately mixed, with substantially uniform distribution, a small quantity of agar-agar finely enough ground to pass through a screen having sixty mesh to the linear inch.

22. A stabilizing agent for making chocolate suspensions consisting of powdered corn starch with which is intimately mixed, with substantially uniform distribution, from 1% to 10%, by weight of the starch on dry substance basis of agar-agar finely enough ground to pass through a screen having sixty mesh to the linear inch.

DAVID E. LINN.